United States Patent
Hayashi

[11] Patent Number: 5,889,378
[45] Date of Patent: Mar. 30, 1999

[54] MOTOR-ASSISTED POWER STEERING APPARATUS

[75] Inventor: Jiro Hayashi, Ama-gun, Japan

[73] Assignee: Denso Corporation, Kariya, Japan

[21] Appl. No.: 895,271

[22] Filed: Jul. 16, 1997

[30] Foreign Application Priority Data

Sep. 19, 1996 [JP] Japan .................................. 8-247715

[51] Int. Cl.$^6$ .................................................. B62D 5/04
[52] U.S. Cl. .......................... 318/541; 318/538; 318/293; 388/907.2; 388/907.5
[58] Field of Search .................................. 318/244, 245, 318/246, 491, 538, 541, 293; 388/907.2, 907.5

[56] References Cited

U.S. PATENT DOCUMENTS

| | | | |
|---|---|---|---|
| 4,857,812 | 8/1989 | Mochizuki et al. | 318/15 |
| 5,119,466 | 6/1992 | Suzuki | 388/831 |
| 5,184,050 | 2/1993 | Harada et al. | 318/467 |
| 5,245,258 | 9/1993 | Becker et al. | 318/266 |
| 5,341,074 | 8/1994 | Zorzolo | 318/17 |
| 5,479,077 | 12/1995 | Kline et al. | 318/443 |

FOREIGN PATENT DOCUMENTS

| | | |
|---|---|---|
| 60-14671 | 1/1985 | Japan . |
| 60-141152 | 7/1985 | Japan . |
| 5-211754 | 8/1993 | Japan . |
| 6-261847 | 9/1994 | Japan . |

OTHER PUBLICATIONS

Motor For Motor–Assisted Power Steering Device, Journal Of Nippondenso Technical Disclosure Nos. 105–015, 105–016 Publication Date: Nov. 15, 1995 (both).

*Primary Examiner*—Bentsu Ro
*Attorney, Agent, or Firm*—Pillsbury Madison & Sutro LLP

[57] ABSTRACT

A motor-assisted power steering apparatus includes a DC motor which is fixed to a heat conductive frame, a torque sensor for detecting steering torque and a control circuit for controlling current supplied to the motor. The control circuit includes a first unit disposed in a space defined by the frame and a commutator of the motor and a second unit disposed outside the motor. The first unit includes multiple switching elements connected to the motor, and the second unit includes a microprocessor for setting motor current, a current detecting unit for detecting current supplied to the motor, a current control unit for providing duty ratio signals and a gate driving circuit for driving the switching elements according to the duty ratio signals.

9 Claims, 3 Drawing Sheets

MOTOR-ASSISTED POWER STEERING APPARATUS

BACKGROUND OF THE INVENTION

1. Field of the Invention

The present invention relates to a motor-assisted power steering apparatus for a vehicle.

2. Description of the Related Art

A recent motor-assisted steering apparatus requires more electric power as it has been adopted to popular cars which have become bigger and heavier.

In such a motor-assisted steering apparatus, because the motor control circuit is disposed on a radially outside portion of the motor, the switching elements in the control circuit are located remote from the brushes of the motor. Thus, the electric resistances of wires connecting the brushes and switching elements are substantial and cause temperature rise of the controller, which in turn causes insufficient performance of the motor and radiation of electric noise.

In order to prevent the temperature rise, it is necessary to control the current flowing in the lead wires by detecting temperatures of the lead wires, switching elements and brushes. This necessitates many temperature sensors and increases the production cost.

SUMMARY OF THE INVENTION

Therefore, a main object of the present invention is to provide a motor-assisted power steering apparatus which has an increased performance of the motor with decreased electric noise, improved structure for cooling the switching elements and decreased number of temperature sensors.

According to the present invention, brushes and switching elements are disposed in a space between a frame for fixing the motor and commutator. As a result, a distance between the brushes and switching elements can be made short so that the wiring resistance between the brushes and switching elements can be reduced, thereby improving the motor performance with less electric noise.

When a large amount of current is supplied in a short time, heat of the switching elements can be dissipated by heat capacity of the motor.

According to another feature of the present invention, the brushes are disposed around the commutator at an angle less than 180° to provide sufficient space to accommodate the switching elements.

According to another feature of the present invention, each of the brushes has a pig tail which is connected to some of the switching elements through a lead wire on the brush support.

According to another feature of the present invention, the circuit board for electrically connecting the switching elements is disposed on the brush support. Therefore, the assembling of the apparatus is easy and the reliability of the connection is improved without increasing the distance between the brushes and switching elements.

According to another feature of the present invention, a temperature sensor is disposed at a portion of one of the lead wires connected to one of the pig tails of the brushes. Therefore, the brush temperature and the switching element temperature can be detected by a single temperature sensor.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A motor-assisted power steering apparatus (hereinafter referred to as EPS) according to the present invention is described with reference to the appended drawings.

Figure 1:
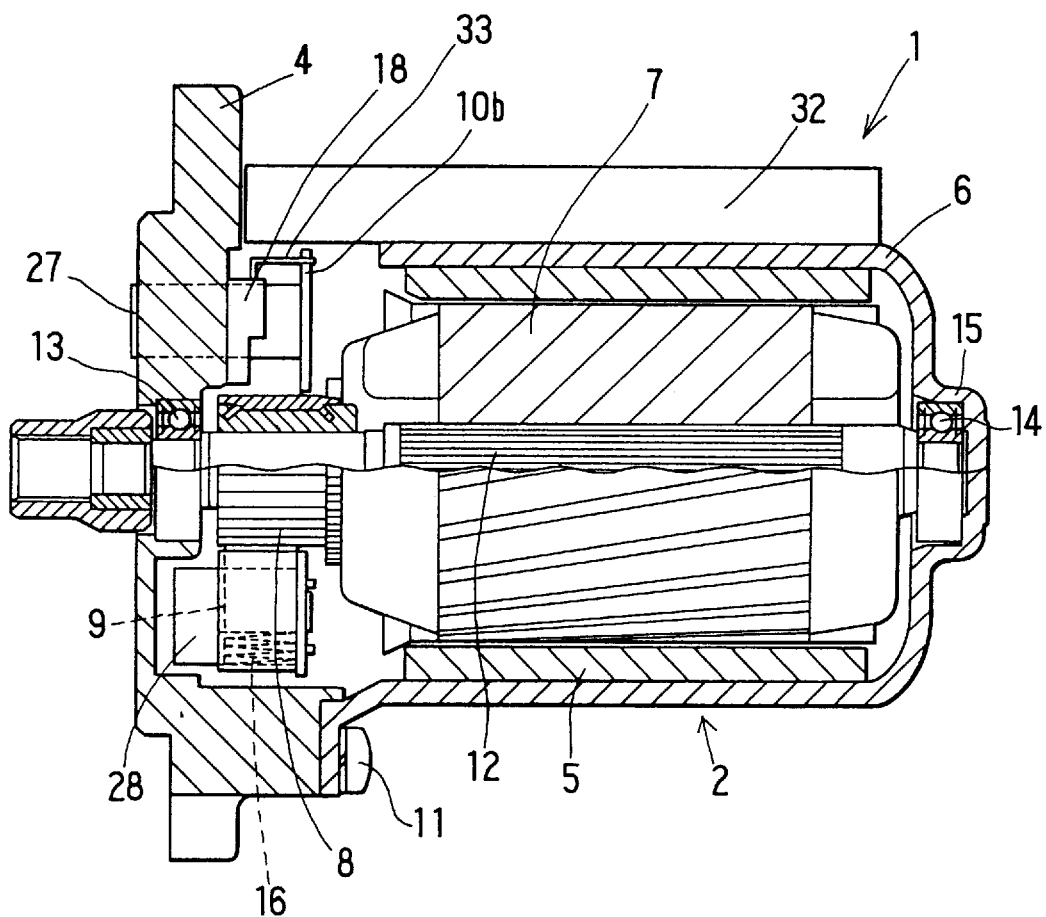
FIG. 1 is a cross-sectional view illustrating a motor-assisted steering apparatus.

As shown in FIG. 1, the EPS 1 is composed of a DC motor 2, a control circuit 3 which controls current supplied to the motor 2 according to the steering force and vehicle speed, and a frame for supporting the motor 2 and control circuit 3.

The motor 2 is composed of a cup-shaped yoke 6 having a magnetic field unit 5 (which is composed of a plurality of permanent magnets), an armature 7 disposed to be rotatable within the magnetic field unit 5, a commutator 8 mounted in the armature 7, a pair of brushes 9 disposed around the commutator 8 in contact therewith and a brush holder 10 for the brushes 9. The armature 7 is disposed vertical to the frame 4 as shown in FIG. 1.

The yoke 6 has a bottom and an open end having a flange which is fixed to the frame 4 by screw bolts 11. The armature 7 has a rotary shaft 12, one end of which carries the commutator 8 and faces the frame 4. One end of the rotary shaft 12 is supported by the frame 4 via a bearing 13, and the other end thereof is supported rotatably by the bottom, of the yoke 6 via a bearing 14.

Figure 2:
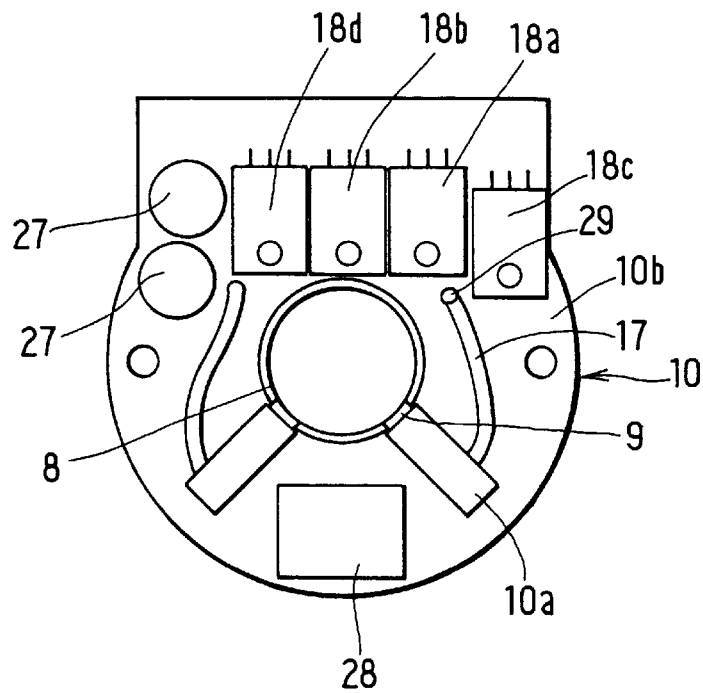
FIG. 2 is a plan view illustrating a brush holder having various components of a control circuit disposed on a brush support.

One of the brushes 9 is disposed at an angle of 90° from the other around the commutator 8 as shown in FIG. 2. Each of the brushes 9 is held to be slidable in a brush case 10a respectively and biased by one of springs 16 toward the commutator 8.

Figure 3:
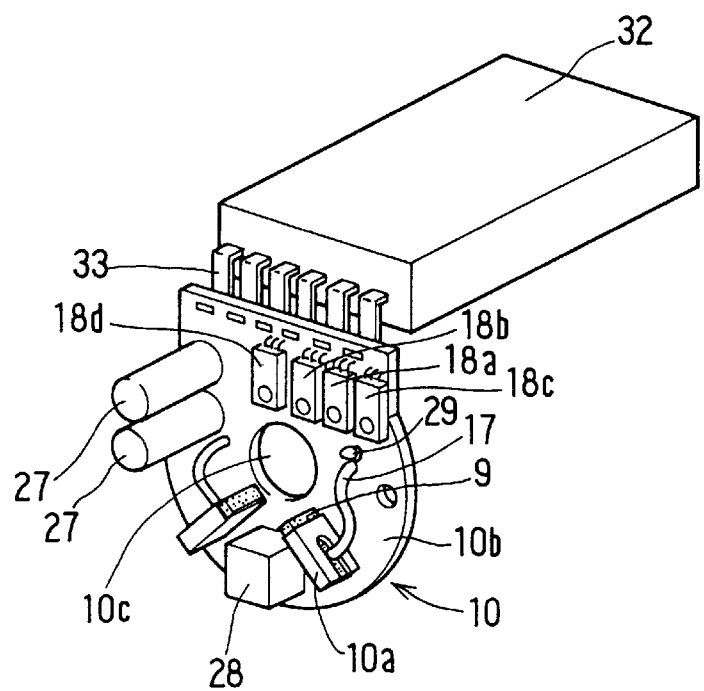
FIG. 3 is a perspective view illustrating a case and the brush support.

The brush holder 10 is composed of the brush cases 10a and a brush support 10b. The brush support 10b has a central hole 10c, as shown in FIG. 3, through which the commutator 8 extends and is disposed inside the yoke 6 around the commutator and fixed to the frame 4 by a screw bolt(not shown) or the like. The brush support 10b has a circuit pattern (not shown) at the surface facing the frame 4 (left surface thereof in FIG. 1). Each of the brushes 9 has a pig tail 17 connected to the circuit pattern.

Figure 4:
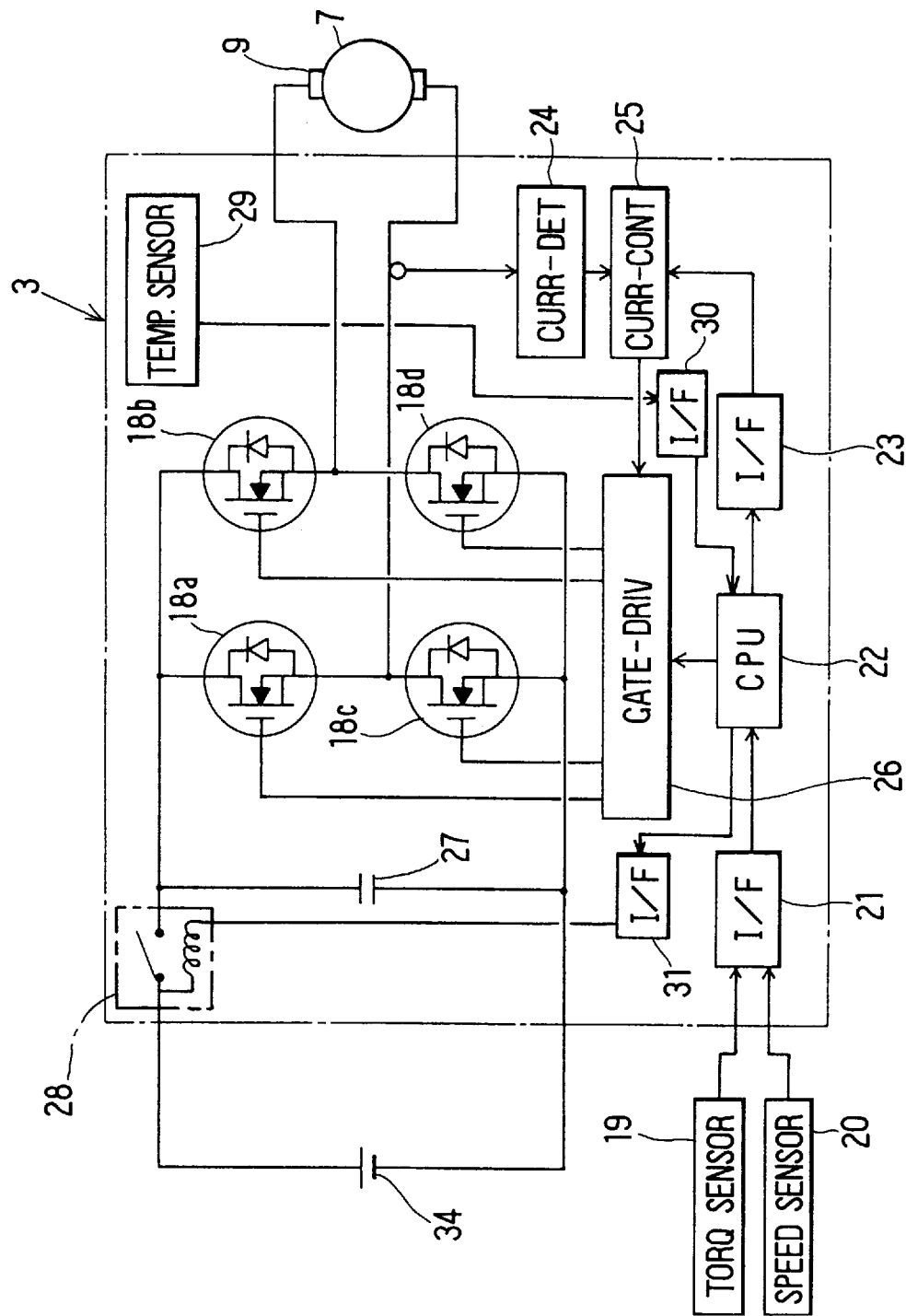
FIG. 4 is a block diagram showing an internal structure of the control circuit.

The control circuit 3, as shown in FIG. 4, is composed of four switching elements 18a–18d, an I/F circuit 21, a microprocessor (CPU) 22, an I/F circuit 23, a current detecting unit 24 for detecting current supplied to the motor 2, a current control unit 25, a gate driving circuit 26, a capacitor 27, a relay 28, a temperature sensor 29 mounted on the brush support 10b (on a portion connected to one of the pig tails 17), an I/F circuit 30, and an I/F circuit 31.

The I/F circuit 21 converts two input signals, one from a torque sensor 19 which detects the steering torque and the other from a speed sensor 20 which detects the vehicle speed, into digital signals. The microprocessor 22 sets motor current, which is required for the torque assisting of the steering, according to the digital signals indicating a steering torque and a vehicle speed. The I/F circuit 23 converts output digital signals of the microprocessor 22 into analog signals. The capacitor 27 smoothes the current supplied to the battery when the switching elements 18a–18d are operating. The current control unit 25 provides duty ratio signals for controlling the switching elements 18a–18d according to the current detected by the current detecting unit 24. The gate driving circuit 26 drives the switching elements 18a–18d according to the duty ratio signals of the current control unit 25 and an assist direction decided by the microprocessor 22. The relay 28 cuts the motor current when some trouble of operation takes place. The I/F circuit 30 converts input signals from the temperature sensor 29 into digital signals, and the I/F circuit 31 drives the relay 28 after converting the digital signals from the microprocessor 22 into analog signals.

A circuit board which connects electric components of the control circuit 3 other than the switching elements 18, capacitor 27 and relay 28 is housed in a case 32, which is disposed outside the motor 2 (on the yoke 6) and fixed to the frame 4 by screw bolts or the like. The switching elements 18a–18d, capacitor 27 and relay are fixed to the brush support 10b at a side of the frame 4 and connected to the circuit pattern of the brush support 10b. As shown in FIG. 3, the electric components housed in the case 32 are connected to the switching elements 18a–18d, capacitors 27 and relay 28 respectively through a plurality of terminals 33 which are insert-molded with the case 32 at one end and fitted to the brush support 10b and soldered to the circuit pattern of the brush support at the other end. The switching elements 18a–18d are fixed to the frame 4 in close contact therewith (in thermal contact) by screw bolts, an adhesive or the like.

The frame 4 is made of a heat conductive material (e.g., aluminum) and is fixed to a housing of the steering mechanism (not shown) in close contact (in thermal contact) therewith. The housing is made of a thick aluminum plate and has a large heat capacity. Since the housing is fixed closely to the frame 4, the heat capacity of the housing is increased by the heat capacity of the frame 4.

Operation of the EPS 1 according to this embodiment of the present invention is described next.

When a driver operates the steering of a vehicle, the steering torque is detected by the torque sensor 19 and is applied to the control circuit 3. At the same time, the input signal from the torque sensor 19 and the speed signal from the speed sensor 20 are applied to the control circuit 3. The assisting torque of the motor and the current to be supplied to the motor are calculated to provide the duty ratio signal. The switching elements 18a–18d turn on and off according to the duty-ratio signal and the direction to assist, thereby controlling the current to be supplied to the motor 2 from the battery 34.

The brush support 10b can be made from a printed board, on which the switching elements 18a–18d are connected so that the brushes 9 and the switching elements 18a–18d can be connected easily and surely without increasing the distance between the brushes 9 and switching elements 18.
(Variation)

The brush support 10b can be made from a resinous plate with conductive terminals instead of the printed circuit board.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A motor-assisted power steering apparatus comprising:

a heat-conductive frame, a DC motor fixed to said heat-conductive frame and having a cylindrical commutator and a pair of brushes, and a control circuit, disposed in a space defined by and in the vicinity of said frame and said commutator, for controlling current supplied to said motor, said control circuit having a plurality of switching elements connected to said commutator through said brushes by lead wires, thereby reducing electric resistance of said lead wires and temperature rise of said control circuit.

2. A motor-assisted power steering apparatus as claimed in claim 1, wherein said control circuit comprises a bridge circuit composed of said switching elements.

3. A motor-assisted power steering apparatus as claimed in claim 1, wherein said brushes are disposed around said commutator in an angle less than 180°.

4. A motor-assisted power steering apparatus as claimed in claim 1 further comprising a brush support, disposed in said space, for supporting said brushes, said switching elements and lead wires, wherein each of said brushes has a pig tail connected to said switching elements by said lead wires.

5. A motor-assisted power steering apparatus as claimed in claim 4 further comprising a circuit board for electrically connecting said switching elements disposed on said brush support.

6. A motor-assisted power steering apparatus as claimed in claim 1, wherein said switching elements are fixed to said control circuit by screw bolts or adhesive.

7. A motor-assisted power steering apparatus comprising:

a frame;

a DC motor fixed to said frame and having a commutator and a pair of brushes;

a control circuit for controlling current supplied to said motor, said control circuit comprising a plurality of switching elements connected to said motor and disposed in a space defined by said frame and said commutator;

a brush support, disposed in said space, for supporting said brushes, said switching elements and lead wires, wherein each of said brushes has a pig tail connected to said switching elements by said lead wires; and a temperature sensor disposed on said lead wires connecting said pig tails and said switching elements.

8. A motor-assisted power steering apparatus comprising:

a frame;

a DC motor fixed to said frame and having a commutator and a pair of brushes;

a control circuit for controlling current supplied to said motor, control circuit comprising a plurality of switching elements connected to said motor and disposed in a space defined by said frame and said commutator;

a brush support, disposed in said space, for supporting said brushes, said switching elements and lead wires; and a smoothing element for smoothing battery current and a fail-safe relay disposed on said brush supports, wherein each of said brushes has a pig tail connected to said switching elements by said lead wires.

9. A motor-assisted power steering apparatus including a frame, a DC motor fixed to said frame and having a commutator and a pair of brushes, a torque sensor for detecting steering torque and a control circuit for controlling current supplied to said motor; wherein said control circuit comprises:

a first unit including a plurality of switching elements connected to said motor and disposed in a space defined by said frame and said commutator; and a second unit including a microprocessor for setting motor current according to digital signals, a current detecting unit for detecting current supplied to said motor, a current control unit for providing duty ratio signals for controlling said switching elements, and a gate driving circuit for driving said switching elements according to said duty ratio signals and disposed on an outside of said motor.

* * * * *